June 7, 1955 H. T. AVERY 2,710,141

DIVIDEND-DIVISOR ALIGNING MECHANISM

Filed Dec. 2, 1950 3 Sheets-Sheet 1

INVENTOR
Harold T. Avery
BY
Howard M. Dustin
AGENT

June 7, 1955 H. T. AVERY 2,710,141

DIVIDEND-DIVISOR ALIGNING MECHANISM

Filed Dec. 2, 1950 3 Sheets-Sheet 2

INVENTOR
Harold T. Avery
BY
Howard M. Dustin
AGENT

DIVIDEND-DIVISOR ALIGNING MECHANISM

Filed Dec. 2, 1950 3 Sheets-Sheet 3

INVENTOR
Harold T. Avery
BY Howard M. Dustin
AGENT

United States Patent Office 2,710,141

Patented June 7, 1955

2,710,141

DIVIDEND-DIVISOR ALIGNING MECHANISM

Harold T. Avery, Oakland, Calif., assignor to Marchant Calculators, Inc., a corporation of California Application December 2, 1950, Serial No. 198,875

6 Claims. (Cl. 235—63)

The present invention relates to calculating machines capable of performing automatic division calculations and particularly concerns carriage shift control mechanism which is operable with the division initiating means to automatically align the dividend and divisor.

The present invention is illustrated as embodied in the commercially known Marchant calculating machine described in the Patent No. 2,271,240 issued January 27, 1942. Some changes have been made in the latter machine since the issue of the above patent but the fundamental principles of operation of the machine are disclosed in the patent and reference is made thereto for an understanding of its operations in general. One of these changes is shown in the Patent No. 2,365,325, issued December 19, 1944 which comprises means, operable by the divide key, to cause automatic clearance of the counter register before initiating the division operation. Another improvement incorporated in that machine includes means, shown in the Patent No. 2,377,767, issued June 5, 1945, which is automatically operable at the end of a division operation to clear the keyboard and dividend register and to tabulate the dividend register to a selected starting position.

The calculating machine shown in the above-mentioned patents includes a plural order numeral keyboard for adjusting respective orders of the numeral wheel actuators in accordance with selected values, and also includes a shiftable carriage upon which are mounted a dividend register and a quotient register. A division problem is performed on this machine by first entering the dividend into the keyboard and then transferring it to the dividend register by depression of a plus key, the keyboard being automatically cleared in response to this plus key depression. The divisor is then entered into the keyboard preparatory to initiation of division.

It is the usual practice to pre-set the decimal point in the keyboard and the dividend register, and the automatic clear and tabulating mechanism disclosed in the above mentioned Patent No. 2,377,767 returns the carriage to a position in which the decimal points are brought into alignment. If the number of digits before the decimal point of the dividend and divisor are the same, the factors are entered in alignment with each other, and in such case division is initiated by depression of the division key alone without the intervention of the aligning mechanism of the present invention. Usually, however, the number of digits before the decimal of the dividend and divisor are not the same and it has heretofore been the practice to align the two factors by depression of the proper left or right shift key before initiation of division.

The present invention avoids the necessity of depressing the shift keys to effect the proper alignment and makes it possible to do so by means of a "Line-Up" key juxtapose the divide key, the simultaneous depression of which enables the mechanism of the above mentioned Patent No. 2,365,325 to clear the counter but momentarily delays the initiation of division. During this momentary delay a mechanism constituting a part of the present invention is brought into play to shift the carriage a predetermined number of orders and align the dividend with the divisor, after which the division mechanism automatically starts its operation. The manner in which the number of orders of shifting is predetermined will be discussed hereinafter in a section entitled "Operation of the line-up mechanism."

It is therefore a principal object of the present invention to condition a calculating machine for operation in the performance of division and to bring the dividend and divisor directly into proper alignment. This is accomplished preferably by initiating operation of the shifting mechanism and by delaying initiation of the division mechanism until the dividend and divisor are brought into alignment.

Another object is to make it possible to selectively enable or disable the line-up mechanism whereby depression of the divide key alone will initiate a division operation without a preceding operation of the line-up mechanism.

Other objects and advantages will become apparent on reference to the following specification when read in conjunction with the accompanying drawings in which.

*Division mechanism*

Figure 1:
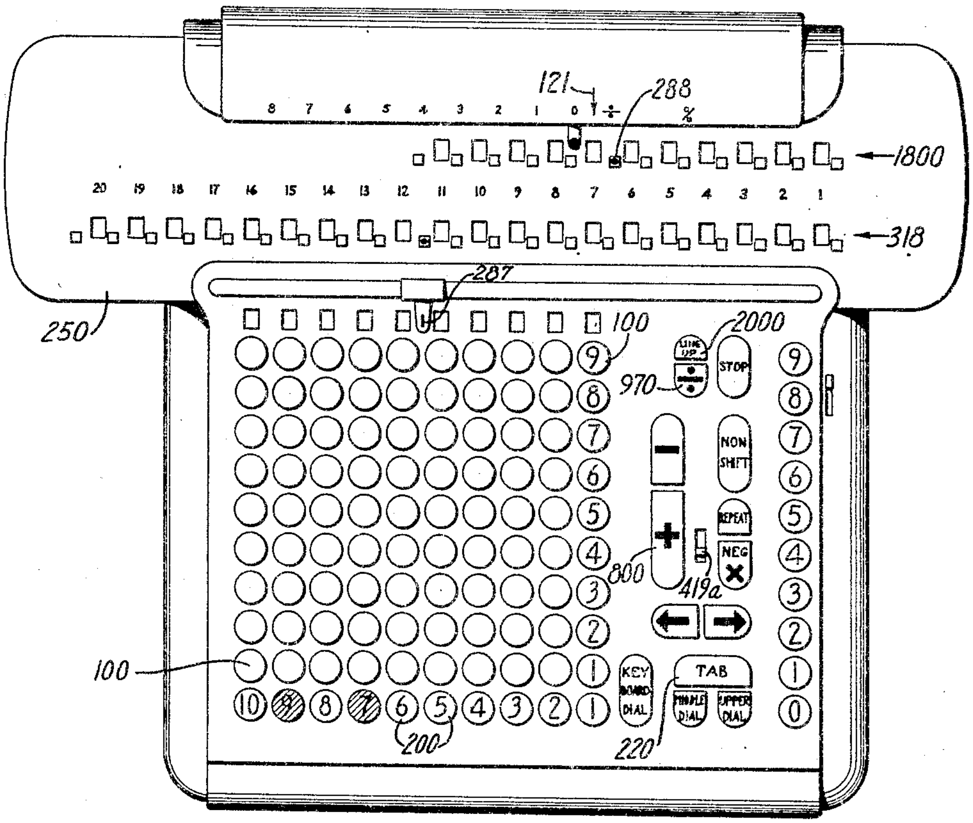
Fig. 1 is an exterior plan view showing the entry and control keys and the registers of the calculating machine in which the present invention is embodied.

The division mechanism, shown in the previously mentioned patents, includes a divide key 970 (Fig. 4) which is depressed to initiate the counter clearance and division operations. Appropriate interlocks are provided to delay the division operation until the counter clearance operation is completed. Counter clearance is initiated by moving a link 348 toward the left as described hereinafter, while division operations are initiated by moving the divide key-stem and the roller 974 to the position shown in Fig. 5 whereupon a division initiating member 975 rocks clockwise from the position shown in Fig. 4 to that shown in Fig. 5. At such time a roller 979 on member 975 depresses an operating bar 503 (Fig. 5) and through an appropriate linkage including plate 515 and link 514 engages a setting, or program clutch (not shown). The latter operates for a single cycle and then engages the main actuator clutch which remains engaged a variable number of cycles. A mechanism compares the remainder of the dividend with the divisor throughout the operation of the main clutch, and when the value of the dividend is reduced to a value less than the divisor the comparison mechanism causes disengagement of the main clutch. At this time the dividend register may or may not have been overdrafted; therefore, a sensing mechanism is provided which is effective to determine whether or not an overdraft has occurred, and if one has occurred, it is corrected by a single plus cycle of actuation after which the dividend register is shifted one order to the left and division operations continue in the next order. This sequence of operations continues from order to order until the problem is completed. While comparison type division disclosed and claimed in Patent No. 2,211,736 issued August 13, 1940 is employed in the machine embodying the present invention, obviously any other division mechanism having a start key may be similarly employed.

*Clearance of the counter before the start of division*

Figures 4, 5:
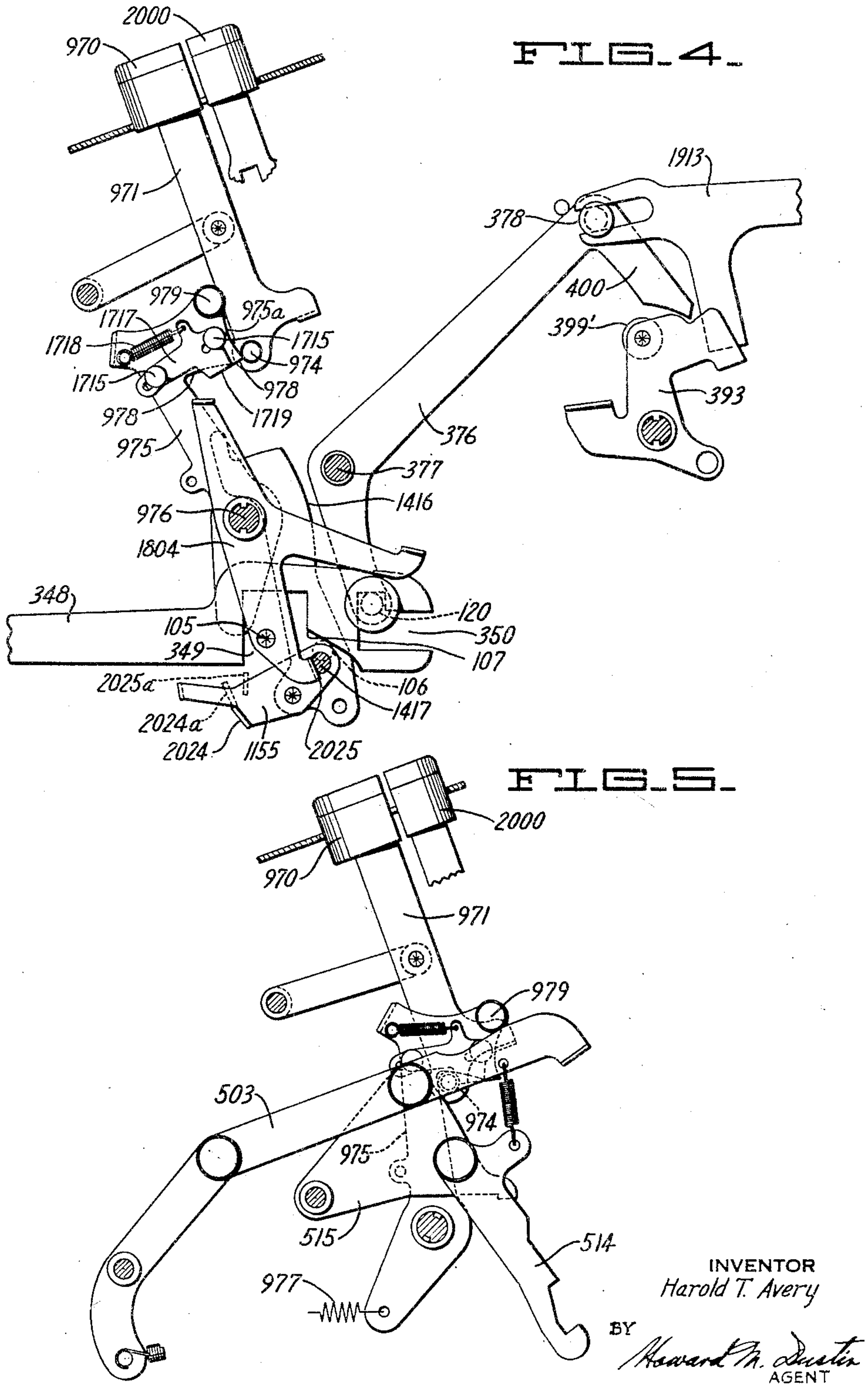
Fig. 4 is a right side view showing divide key and the counter clearance initiating mechanism.
Fig. 5 is a right side view, showing the divide key and associated mechanisms in division initiating positions.

Referring now to the mechanism for causing a counter clearance operation, the divide key 970 (Fig. 2) has a key-stem 971 supported by a pair of parallel levers 972 and 973 as described in the previously mentioned Patent No. 2,271,240. Lever 973 is pivotally mounted intermediate its ends to the framework of the machine and a link 965 connects the lower end of lever 973 to a bellcrank 1026 which is fixed to the transverse shaft 976, so that upon depression of the divide key the bellcrank is rocked in a clockwise direction. In the present case the shape of the bellcrank 1026 has been altered slightly from that shown in the last mentioned patent for purposes described shortly hereinafter, but the bellcrank still serves the function of causing the clockwise rocking movement of the shaft 976 and thus conditions the machine for division operations which are subsequently initiated by the clockwise movement of the division initiating member 975 (Fig. 4).

A second bellcrank 1804 is fixed to shaft 976 and carries a pin 105 which is adapted to engage the left edge of an aperture 349 in the counter clearance link 348 and move the latter toward the left during the first portion of the depression of the divide key. Link 348, as described in the Patent No. 2,365,325, is one member in an articulated linkage to a clear clutch control member 1913 and has a second aperture 350, in the form of an L, formed in its right end which embraces a stud 120 carried by a bellcrank 376. The latter is pivotally mounted to the machine framework at 377 and the upper rightmost end of the bellcrank carries a stud 378 which is embraced by the bifurcated tip of the clear clutch control member 1913. When the latter is in the position shown it is effective to hold the clear clutch (not shown) disengaged.

When the divide key 970 is depressed, the leftward movement of the clear link 348 rocks the bellcrank 376 clockwise, which rocks the clear clutch control member 1913 counterclockwise to cause engagement of the clear clutch and operation of the clearing mechanism described fully in Patent No. 2,294,949 issued September 8, 1942. The clear clutch is limited to a single cycle of operation as follows:

The clear link 348 has a camming edge 107 which lies adjacent a stud 106 fixed to an intermediate frame member. When the link 348 is moved toward the left, the surface 107 is cammed upwardly over stud 106 and during such upward movement the contacting surface of the upper end of the L-shaped slot 350 is disengaged from pin 120, allowing the pin to move into the horizontal portion of the slot, thus breaking the connection between the clear link 348 and the bellcrank 376. In this manner, the movement of the link 348 towards the left in response to the depression of the division key is operable to cause clearance of the counter register and at the same time to limit the counter clear clutch to a single cycle of operation.

The division operation is also initiated by depression of the divide key, and to prevent concurrent operation of the division mechanism with the above-mentioned counter clearance mechanism, an interlock, including the previously mentioned bellcrank 376, is provided which is effective throughout a counter clearance operation to prevent the start of division. When the bellcrank 376 is rocked clockwise about the pivot 377 to engage the clear clutch, its rightmost end 400 moves clockwise and into blocking relation with a roller 399' carried on a member 393. At such time the latter member is restrained from clockwise movement, and through mechanism shown in the previously mentioned Patent No. 2,365,325, prevents initiation of division until the clear clutch is disengaged.

A means is shown in the Patent No. 2,393,018 issued January 15, 1946, and incorporated in the present machine, for insuring the full depression of the divide key even though an operator should release the key after a partial depression thereof. This means includes the previously mentioned roller 974 (Fig. 4) on the bottom of the divide keystem 971, which cooperates with the division initiating member 975, freely mounted on shaft 976. Member 975 is urged clockwise by a spring 977 (Fig. 5) but is normally locked in the position shown in Fig. 4 by the engagement of a face **975*a* with the roller 974. When the divide key is depressed the roller 974 moves slightly beneath the face of the division initiating member 975 and permits the latter to rock clockwise in response to the spring 977, at which time the roller 979, carried on the upper portion of the division intiating member, contacts the operating bar 503 (Fig. 5) and tends to depress the same and engage the setting clutch. The previously described interlock 400—399' (Fig. 4), however, prevents the initiation of a setting clutch operation and thereby prevents the division operating bar 503 from being fully depressed by the roller 979** until the end of the counter clearance operation.

The arrangement of the division initiating member 975 is such that even though this member is blocked from moving to its full clockwise position during the operation of the clear clutch, a constant force is exerted upon the member 975 so that at the end of the clear clutch operation the member will be moved to its clockwise position to initiate the division operation. In the absence of such a mechanism, the operator would be required to hold the key 970 depressed until the end of the counter clearance operation and until the division member 975 was moved to its full clockwise position.

For this purpose member 975 carries a member 1717 (Fig. 4) provided with an edge 1719 engageable with roller 974 when the divide key is depressed. The edge 1719 extends along a line disposed at an obtuse angle with respect to a radius extending from shaft 976 as a center and therefore acts, during clockwise movement of member 975, as a cam which engages roller 974 to effect additional downward movement of key 970.

Since the division member 975 is reciprocated between its counterclockwise and clockwise position in each order of division operations, the following mechanism is provided to permit the member 975 to be returned to its counterclockwise position without restraint from the roller 974. For this purpose, the member 1717 is movably mounted on member 975 by means comprising pins 1715 on member 975 extending through arcuate slots in member 1717, so that during counterclockwise movement of member 975, member 1717 will not cam the roller 974 down, but will move rightwardly and upwardly with respect to member 975 by said roller overcoming the spring 1718 which normally holds member 1717 in the position shown. During such movement, the roller 974 will be guided by the arcuate lower edge 978 of member 975, which edge conforms to an arc described upon a radius about shaft 976.

From the foregoing description of the divide key and related mechanism, it will be seen that depression of the divide key is operable to first cause clearance of the counter register and then to initiate the division operation which is automatically carried out.

*Tabulating mechanism*

A tabulating mechanism is incorporated in the present machine which is of the same type as shown in the Patent No. 2,502,321 issued March 28, 1950. A tabulation of carriage 250 toward the right is initiated by the master tab key 220 (Fig. 1) and is terminated by any one of the depressed ordinal tab keys 200. As shown in Fig. 1, the number "7" tab key has terminated a carriage shift with the carriage in its "7" position, such position being indicated by the arrow 121 on the back cover.

With the carriage in the "7" position, depression of the master tab key 220 would initiate another right shift of the carriage which would be terminated under the control of the depressed "9" tab key 200 and at which time the arrow 121 would point to the "9" on the carriage cover. In this respect, it will be noted that the carriage positions are numbered in inverse order with respect to the numbering on the tab keys 200. The tabulating operation is initiated by rocking a latch 240 (Fig. 2) out of restraining engagement with an ear 245 on a toggle link 247 by any one of several mechanisms including the main tabulator initiating key 220 (Fig. 1). At such time the toggle 247—248 collapses and is effective through a lever 252 to engage the shift clutch and cause rightward shifting of the carriage to a position determined by the previous depression of one of the keys 200 (Fig. 1), all as is described in the above mentioned Patent No. 2,502,321.

The above mentioned latch 240 is also rocked counterclockwise to initiate a tabulating operation when the line-up key 2000 (Fig. 2) is depressed simultaneously with the divide key 970, as is fully described hereinafter.

*Automatic return shift and clearance mechanism*

A mechanism is shown in the Patent No. 2,377,767 issued June 5, 1945, which is selectively operable at the conclusion of a division operation to cause three operations: (1) clearance of the dividend register, (2) clearance of the keyboard, and (3) return tabulation of the dividend register to a pre-determined ordinal position.

The automatic return shift and clearance mechanism mentioned above is included in the machine of the present invention and comprises, in part, a manually settable lever 419*a* (Fig. 1) which corresponds in function and reference numeral to an identical part in the above mentioned patent. Lever 419*a* may be adjusted to a forward or a rearward position, and when moved to the forward position shown in Fig. 1 it is effective to condition various mechanisms which become operable at the end of a division problem to initiate the three operations outlined above. The automatic shift and clearance mechanism can be disabled by moving the lever 419*a* to its rearward position before the division operations are initiated. The clear and shift mechanism described above is particularly useful for returning the dividend register to a pre-determined ordinal position relative to the keyboard so that the entry of the various dividend and divisor factors for a series of division problems may be made around the same keyboard decimal point.

It should be noted, however, that while the present invention preferably is incorporated in a machine having the above described automatic return tabulation and clearance mechanism, this mechanism and the present line-up mechanism are distinct and independent of each other. The line-up mechanism of the present invention is operable to tabulate the dividend register to a predetermined position prior to the initiation of division operations regardless of whether or not the automatic tabulation and clearance mechanism is operable at the conclusion of the previous division operation. The foregoing description of the automatic return tabulation and clearance mechanism is therefore believed sufficient for an understanding of the operation of the present machine in which the invention is incorporated, reference being had to the Patent No. 2,377,767 for a more complete description thereof.

*Line-up key*

The start of division following a momentary delay thereof, during the clearance of the counter as described above, is responsive to depression of the divide key alone. If the number of digits before the decimals of the two factors are such that the highest orders of the dividend and divisor are not aligned, then the operator may depress the line-up and divide keys together, thereby causing clearance of the counter, as before, and also tabulation of the register carriage to a pre-selected ordinal position for lining up the dividend and divisor before initiation of the division operation.

Various arrangements of the control exercised by the divide and line-up keys could be provided. For example, the line-up key could exercise direct control over the shift mechanism for causing the line-up operation, but it seems preferable to arrange the mechanism of the present machine so that the line-up key merely conditions or enables the divide key to initiate the shift as well as the counter clearance and division operations. This conditioning mechanism includes a lever referred to hereinafter as the blocking member, which may be selectively adjusted to establish or break a connection between the divide key and the tabulation initiating mechanism. When the line-up key and the divide key are simultaneously depressed the sequence of operations is as follows. The depression of the divide key directly initiates a counter clearance operation, and through the above-mentioned connection established by the line-up key, the divide key trips the shift toggle 247—248 (Fig. 2) to cause a tabulating operation to follow the clearance operation. Also, the depression of the divide key releases spring urged mechanisms tending to intiate the division operation but which operation is delayed until the clearance and tabulating operations are completed.

Since the depression of the line-up key alone does not initiate machine operations but merely serves to condition the various mechanisms described hereinafter, the line-up key can be depressed in advance of the depression of the divide key; however, in the interest of brevity the depression of the line-up and divide keys is referred to hereinafter as being simultaneous.

Referring now to the mechanism whereby the line-up key conditions the machine for line-up operations, the line-up key 2000 (Fig. 2) has a keystem 2002 which is mounted for up and down sliding movement upon the fixed studs 2003, while a torsion spring 2004 urges the key to its raised position. The lower end of the line-up key carries a pin 2005 situated within a slot 2006 of a lever 2007, pivotally mounted at 2008 to the previously mentioned bellcrank 1026. The rightmost end of the lever is formed as a hook 2009, which overlies an offset 2010 on a blocking member 2011 pivotally mounted at 2012 to a lever 2013. The arrangement is such that when the divide key 970 alone is depressed and the bellcrank 1026 is rocked clockwise, the latter is effective through the pivotal connection 2008 to move the lever 2007 towards the left. At such time the slot 2006 rides over the pin 2005 and guides the hook 2009 in such a manner as to cause the hook to engage the offset 2010 and move the blocking member 2011 counterclockwise. The upper end 2014 of the blocking member is therefore moved out of the path of an ear 2015 formed on the upper arm of the previously mentioned bellcrank 1026, thus permitting the bellcrank 1026 and associated mechanisms to rock clockwise and initiate the counter-clearance and division operations.

When the line-up key 2000 is depressed simultaneously with the division key 970, however, the pin 2005 on the line-up keystem rocks the lever 2007 counterclockwise so that the hook 2009 is moved counterclockwise and away from the offset 2010, and is prevented from moving the blocking member 2011 from the position shown. Then, as the bellcrank 1026 continues to rock clockwise, the ear 2015 contacts the upper end 2014 of the blocking member 2011 and depresses the same to initiate the line-up operation as follows. The upper end 2014 of the blocking member lies adjacent a fixed bushing on shaft 2041 to limit the clockwise movement of the blocking member against the tension of a spring 2040. The supporting lever 2013 is pivoted upon a stud 2017, fixed to the framework of the machine, and the rightmost end of the lever carries a bifurcated tip 2018 which embraces a shaft 2019 to limit the rocking movement of the lever. A web 2020 connects the right and left arms respectively of the lever 2013, and a spring 2021, connected to the web 2020 and to a lever 2030, urges the lever 2013 counterclockwise to the position shown. The left end of lever 2013 has an ear 2022 which underlies the right end of a lever 2023 freely mounted on the shaft 285 and lying adjacent the latch 240. The latter has a pair of laterally bent ears 240′ overlying a shoulder 2042 on lever 2023 so that the lever and the latch move together as an integral unit.

Figures 2, 3:
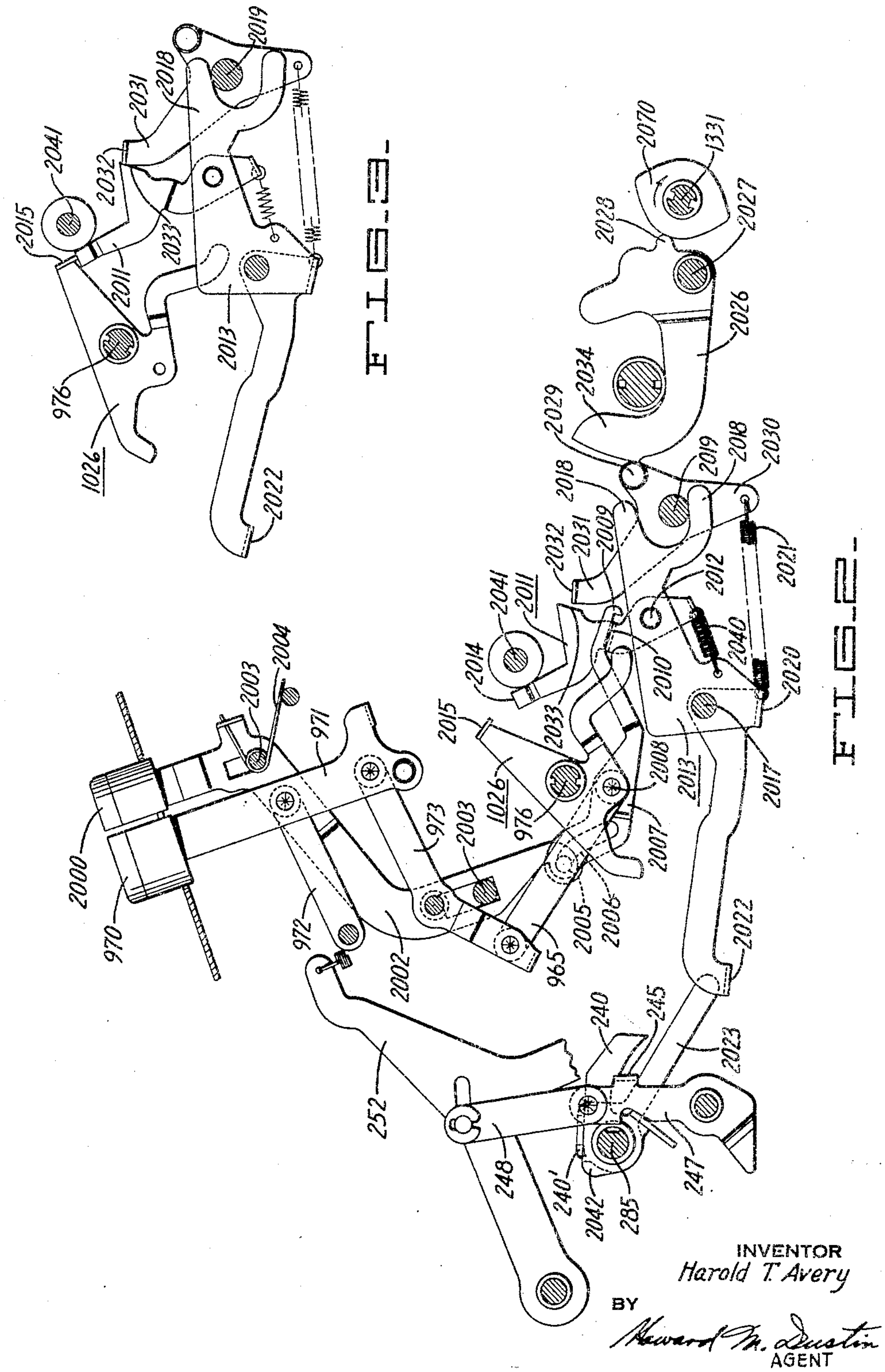
Fig. 2 is a right side view showing the divide key, the line-up key and associated mechanisms.
Fig. 3 is a portion of the mechanism shown in Fig. 2 in "line-up" initiating position.

The arrangement is therefore such that the simultaneous depression of the line-up key 2000 and the divide key 970 causes the ear 2015 on the bellcrank 1026 to contact the blocking member 2014 and to move the blocking member 2011 downwardly from the position shown in Fig. 2 to that shown in Fig. 3, where it is limited by contact of the upper arm of the bifurcated tip 2018 against the shaft 2019. At such time the ear 2022 (Fig. 2) on the left end of lever 2013 rocks the lever 2023 and the latch 240 counterclockwise and tends to initiate the tabulating operation in the manner previously described. The depression of the divide key, however, has meanwhile initiated a single cycle operation of the counter clear clutch; therefore, the following means are provided to delay the initiation of the tabulating operation until the counter clearance operation is completed.

The member 393 (Fig. 4) is rocked clockwise upon engagement of the right shift clutch (not shown), the latter being engaged during a tabulation to the right, all as described in the previously mentioned Patent No. 2,365,325. When the latch 240 (Fig. 2) is rocked counterclockwise in response to simultaneous depression of the line-up and divide keys to initiate the tabulating operation, the member 393 tends to rock clockwise, but since the counter clearance clutch is engaged at this time the bellcrank 376 is in a clockwise position with the arm 400 in blocking relation to the roller 399′. Engagement of the shift clutch is therefore prevented until the end of the single cycle of operation of the clearance clutch. It will be noted that even though the toggle 247—248 (Fig. 2) is collapsed to cause the engagement of the right shift clutch while the operation of the same is prevented, there is no conflict between the parts due to a yieldable connection (not shown) between the toggle and the shift initiating member, all as is described in the last mentioned patent.

It will be noted that the previously described blocking of the bellcrank 1026 in its partially rocked clockwise position shown in Fig. 3 is effective through the connecting link 965 and lever 973 to prevent the full depression of the divide key 970. The amount of depression which is permitted is sufficient to move the roller 974 on the division keystem past the face 975*a* of the division initiating member and slightly below the surface 978 of member 975, but is insufficient to permit the division initiating member 975 to rock clockwise the full extent shown in Fig. 5, thus preventing initiation of the division operation at this stage in the sequence of operations. The spring 977, however, constantly exerts a force on member 975 tending to rock the same clockwise to initiate the division operation. It will therefore be evident that the division operation may be initiated at any time after the tabulating operation is completed by moving the blocking member 2011 counterclockwise from the position shown in Fig. 3, to remove the upper end thereof out of restraining engagement with the ear 2015 of the bellcrank 1026. In the present embodiment, however, it is preferred to use power derived from the shift clutch to impose a second block upon the division initiating mechanism and then to remove the above described first blocking member 2011 from its blocking relationship with bellcrank 1026. This transfers the control of the initiation of division operations to the second blocking mechanism and since the latter is directly responsive to the termination of the shift operation, as described hereinafter, the initiation of the division operation occurs automatically at the end of the line-up operation.

The second block for the division initiating mechanism includes an ear 2024 (Fig. 4) on a shift control lever 1155, which ear is moved to the dotted line position 2024*a* upon engagement of the shift clutch, as described below. In this position, ear 2024 cooperates with an ear 2025 on the bellcrank 1804 in such a manner as to block the latter and therefore block the integral bellcrank 1026 (Fig. 3) in substantially the position shown in Fig. 3 even though the first blocking member 2011 is rocked counterclockwise out from restraining engagement with ear 2015 of the bellcrank 1026.

Referring first to ear 2025 on bellcrank 1804 (Fig. 4) this ear normally stands in the full line position shown, but when bellcrank 1026 (Fig. 2) is rocked clockwise to the position shown in Fig. 3, the bellcrank 1804 (Fig. 4) also rocks clockwise therewith and the ear 2025 moves to the dotted line position 2025*a*. In this position ear 2025 lies above and slightly to the right of ear 2024, and when the shift clutch is engaged to cause the line-up operation, a lever 1416, fixed to lever 1155, rocks clockwise about pivot 1417 as described in the previously mentioned Patent No. 2,365,325, thereby moving ear 2024 to the dotted line position 2024*a* where it lies in the path of ear 2025. With this condition of the parts, the blocking member 2011 (Fig. 3) may be rocked counterclockwise out of blocking engagement with bellcrank 1026, but the latter cannot then rock clockwise the full extent necessary to initiate the division operation since ear 2025 (Fig. 4) is almost immediately blocked by ear 2024. This transfers the control of the division initiating mechanism to the shift control lever 1155 and its ear 2024 which remain in the blocking position described until the line-up operation is completed.

Meanwhile a mechanism including cam 2070 (Fig. 2) is operable by the shift clutch to rock the blocking member 2011 (Fig. 3) counterclockwise out from under ear 2015 of bellcrank 1026 to transfer the control of the latter to ears 2024 and 2025 as described above. Cam 2070 is fixed to a shaft 1331 which corresponds in reference numeral and function to a similar shaft described in the previously mentioned Patent No. 2,365,325. This shaft is driven in timed relation with the shift clutch and rotates 180° for each cycle of operation of the clutch. A cam follower 2026 is freely mounted on a shaft 2027 and carries an extension 2028 which rides on the periphery of the cam, while an upper leftward extension 2034 of the follower 2026 lies adjacent a roller 2029 carried by a bellcrank 2030 freely pivoted on the shaft 2019. An upper extending arm 2031 of the latter bellcrank has an ear 2032, and when the blocking member 2011 is depressed and in the position shown in Fig. 3, the ear 2032 lies adjacent a camming surface 2033 of the blocking member 2011. The arrangement is such that the first cycle of operation of the shift clutch causes the cam 2070 to rock the follower 2026 and the extension 2034 counterclockwise and to rock the blocking member 2011 counterclockwise out of the path of the ear 2015 of bellcrank 1026. The integral bellcranks 1026 and 1804 (Fig. 4) then are rocked clockwise by pressure exerted by the division initiating member 975 on the divide key and the linkage to bellcranks 1026 and 1804 as previously described. Such rocking movement of the bellcranks, however, is almost immediately blocked due to the contact of the ear 2025 (Fig. 4) on the bellcrank 1804 with the ear 2024 on member 1155. The rocking movement of the bellcrank 1026 (Fig. 2) is sufficient, however, to permit ear 2015 on the bellcrank to snap over the upper end 2014 of the blocking member 2011 and prevent the same from returning to blocking position at the end of each shift clutch cycle.

The engagement of the shift clutch shifts the dividend register to the right to a selected position determined by the previous depression and locking down of one of the tabulation keys 200.

Two such keys may preferably be locked down such as the #7 and #9 tab keys 200, indicated by the shading in Fig. 1. Assuming that the previously mentioned automatic clear and return mechanism was operable at the end of the preceding division operation to return the carriage to its #7 position, then during the line-up operation the carriage may be shifted to the #9 position, should it be necessary to do so in order to line up the dividend and divisor.

The previously mentioned ear 2024 (Fig. 4) blocks ear 2025 throughout the shifting operation until the shift clutch is disengaged, whereupon lever 1416 and member 1155 are automatically returned to their initial counterclockwise position as described in the Patent No. 2,365,325, thus moving ear 2024 out of restraining engagement with ear 2025. This permits the bellcrank 1804 and its integral bellcrank 1026 (Fig. 2) to rock clockwise, due to the urgency of the above described division initiating member 975, and to initiate division operations which are then automatically carried out in the manner described in the previously mentioned Patent No. 2,211,736.

At the end of the division operation the quotient appears in register 1800 (Fig. 1) and if the automatic clear and return mechanism has been enabled by movement of the control lever 419*a* (Fig. 1) to the forward position shown, then the dividend register 318 is automatically cleared and the carriage 250 is returned to the right to a position corresponding to the rightmost depressed tabulator key 200.

*Operation of the line-up mechanism*

The advantages of the present invention are best illustrated in connection with the performance of a series of division calculations. In such a case, the operator should preferably determine how many digits after the decimal point of the quotient should be computed, and set the decimal indicator 288 (Fig. 1) immediately to the left of the corresponding number of orders of the quotient register 1800. Depress the tabulator key 200 corresponding to the number of units order quotient dial (the dial immediately to the left of the set decimal point) which, in the case of the illustration shown in Fig. 1, is the #7 dial and the corresponding #7 tabulator key. The decimal indicator 287 for the keyboard is set to a position corresponding to the average position of the decimal point in the dividend and divisor factors of the series of division problems, allowing for the largest number of digits before and after the decimal point of the factors.

The first problem is then set up by entering the dividend into the keyboard 100 around the keyboard decimal point, depressing the plus key 800 and then entering the divisor into the keyboard around the same decimal point. If the divisor contains fewer digits before the decimal point then the dividend, as is often the case, the carriage must be shifted towards the right to align the highest order of the dividend with the highest order of the divisor. Therefore, before starting the first division calculation, the operator should preferably scan the factors of the problems of the series and determine the greatest difference in any one problem between the number of digits before the decimal point (hereinafter referred to as the integral digit) in the dividend and the number of integral digits in the corresponding divisor. A second tabulator key 200 is then depressed to the left of the one previously depressed so that both keys are latched down. The position of the second key is located a number of orders to the left of the first key corresponding to the above mentioned greatest difference between the number of integral digits in the dividend and its corresponding divisor. The division computation is then initiated by depressing the line-up key and the divide key simultaneously, whereupon the machine shifts the carriage to the right through a number of orders which will accommodate any of the division problems, and then starts the division computation. In those problems where the difference between the number of integral digits in the dividend and divisor is less than the number of ordinal shifts which occur during the line-up operation or rightward shift of the carriage, the machine merely computes one or more zero quotient digits before starting the actual division problem.

When the calculation is completed, the automatic clear and return mechanism described hereinbefore, clears the keyboard and the register 318, and returns the carriage to the position corresponding to the tabulator key first depressed (the number 7 key). The quotient may be recorded and the next problem set up and the calculation initiated by the simplest conceivable operating sequence, which, summarizing, consists of entry of the dividend, depression of the plus key, entry of the divisor and depression of the line-up and divide keys simultaneously, whereupon the dividend and divisor are aligned, the problem is computed and the decimal of the result is automatically pointed off, followed by a normalizing of the machine preparatory to the set up of the next problem.

In those calculations where the number of integral digits of the dividend and divisor are the same, the factors are entered with the highest orders of each in alignment, therefore no line-up operation is necessary. In such cases, the operator follows the above sequence except that division is initiated by depressing the divide key alone.

I claim:

1. In a calculating machine having value entering mechanism, a carriage ordinally shiftable relative to said entering mechanism, mechanism for shifting said carriage through a plurality of orders, tabulator control means selectively settable to terminate the operation of the shifting mechanism with the carriage in a position corresponding to the selective setting of said tabulator control means, a register mounted in said carriage to receive a value from said entering mechanism, and division mechanism operable to divide the value in said register by the value in said entering mechanism; the combination of, a divide key and means responsive thereto for initiating operation of the division mechanism, a second key, means enabled by said second key and operable under control of said divide key to initiate operation of the shifting mechanism, division delay means, mechanism controlled by said shift initiating means to render said division delay means effective, and means responsive to said shift terminating mechanism to disable said division delay means.

2. In a calculating machine having selectively settable value entering mechanism, a carriage ordinally shiftable relative to said entering mechanism, mechanism for shifting said carriage through one or more ordinal positions thereof including shift drive means, mechanism for initiating operation of the shift drive means, and tabulator control means selectively settable to terminate operation of the drive means with the carriage in an ordinal position corresponding to the selective setting of said tabulator control means, a register mounted in said carriage to receive a value set in said entering mechanism, and division mechanism operable to divide the value in said register by the value in said entering mechanism; the combination of, a divide key normally effective upon depression thereof to initiate operation of the division mechanism, a second key, means responsive to simultaneous depression of said two keys to cause operation of said shift initiating mechanism, and division delay means operable concurrently with said shift initiating means to render said divide key ineffective to initiate operation of the division mechanism, and means controlled by said tabulator control means upon termination of the operation of said shift drive means to render said division delay means ineffective.

3. In a calculating machine having value entering mechanism, a carriage ordinally shiftable relative to said entering mechanism, mechanism for shifting said carriage to a predetermined ordinal position thereof, a register mounted in said carriage to receive a value from said entering mechanism, and division mechanism operable to divide the value in said register by the value in said entering mechanism including a division control member movable from an ineffective position to an effective position to start operation of the division mechanism; the combination of, a divide key effective upon depression thereof to release said control member for movement from said ineffective position to said effective position, a second key, means responsive to simultaneous depression of said two keys to initiate operation of the shifting mechanism, and delay means also responsive to said simultaneous key depression to concurrently prevent movement of said control member to its effective position, with mechanism operable with the carriage in said predetermined position to terminate operation of said shifting mechanism, and means responsive to said shaft terminating mechanism to disable said delay means.

4. In a calculating machine having value entering mechanism, a carriage ordinally shiftable relative to said entering mechanism, mechanism for shifting said carriage to a predetermined ordinal position thereof, a register mounted in said carriage to receive a value from said entering mechanism, and division mechanism operable to divide the value in said register by the value in said entering mechanism including a division control member movable from an ineffective position to an effective position to start operation of the division mechanism; the combination of, a divide key effective upon depression thereof to release said control member for movement from said ineffective position to said effective position, a second key, means responsive to simultaneous depression of said two keys to initiate operation of the shifting mechanism, and means operable by said shifting mechanism during the operation thereof to restrain movement of said control member to its effective position, with mechanism operable with the carriage in said predetermined position to terminate operation of said shifting mechanism, and means responsive to said shift terminating mechanism to release said control member from restraint of said restraining means.

5. In a calculating machine having value entering mechanism, a carriage ordinally shiftable relative to the entering mechanism, mechanism for shifting said carriage including shift drive means and mechanism for initiating operation thereof, a register mounted in said carriage to receive a value from the entering mechanism, and division mechanism operable to divide the value in said register by the value in said entering mechanism; the combination of, division initiating means including a divide key effective upon depression thereof to initiate operation of the division mechanism, a second key, and means operable by said key upon depression thereof to render the divide key effective to cause operation of the shift initiating mechanism and to render said division initiating means ineffective to initiate operation of the division mechanism, with shift terminating mechanism, and means responsive to operation of the shift terminating mechanism to render said division initiating means effective to initiate operation of said division mechanism.

6. In a calculating machine having value entering mechanism, a carriage ordinally shiftable relative to the entering mechanism, mechanism for shifting said carriage including shift drive means and mechanism for initiating operation thereof, a register mounted in said carriage to receive a value from the entering mechanism, and division mechanism operable to divide the value in said register by the value in said entering mechanism including a division control member movable from an ineffective position to an effective position to start operation of the division mechanism; the combination of, a divide key effective upon depression thereof to release said control member for movement from said ineffective position to said effective position, a second key, and means operable by said key upon depression thereof to render the divide key effective to cause operation of the shift initiating mechanism and to restrain movement of said control member to said effective position, with shift terminating mechanism, and means responsive to the shift terminating mechanism to disable said restraining means and permit movement of said control member to said effective position.

References Cited in the file of this patent

UNITED STATES PATENTS

| | | |
|---|---|---|
| 2,365,325 | Avery | Dec. 19, 1944 |
| 2,365,507 | Allen | Dec. 19, 1944 |
| 2,636,677 | Gang | Apr. 28, 1953 |